United States Patent [19]
Fisher et al.

[11] 3,844,017
[45] Oct. 29, 1974

[54] APPARATUS FOR GAPPING ZIPPER CHAIN

[75] Inventors: Harry Fisher; Stuart Fisher, both of Whitestone, N.Y.

[73] Assignee: Stagg Zipper Corp., Brooklyn, N.Y.

[22] Filed: Nov. 21, 1972

[21] Appl. No.: 308,485

[52] U.S. Cl............................................ 29/207.5 D
[51] Int. Cl............................................. B23p 19/04
[58] Field of Search........ 29/207.5 D, 207.5 R, 408, 29/207.5 SL, 207.5 ST

[56] References Cited
UNITED STATES PATENTS

| | | | |
|---|---|---|---|
| 3,368,269 | 2/1968 | Perlman.......................... | 29/207.5 D |
| 3,538,582 | 10/1970 | Perlman.......................... | 29/207.5 D |
| 3,611,538 | 10/1971 | Takamatsu...................... | 29/207.5 D |

*Primary Examiner*—Thomas H. Eager
*Attorney, Agent, or Firm*—Curtis, Morris & Safford

[57] ABSTRACT

A device for continuously producing individual strips of zipper chain from a continuous zipper chain, wherein each of the individual strips has a predetermined length and a predetermined array of zipper teeth removed therefrom, includes a first station at which a predetermined array of zipper teeth are removed from the continuous zipper chain and wherein that chain is precisely located prior to removal of the teeth so that only a desired array of teeth are removed therefrom. A second operating station is located downstream of the first station, along the path of travel of the zipper chain through the device, and a detecting apparatus is provided at this station for detecting a previously removed array of zipper teeth in the chain. The detecting apparatus sequentially actuates the apparatus performing the various operations at the first station and a cutting mechanism for cutting the zipper chain at the second station upon detection of a removed array of teeth, whereby the continuous zipper chain is cut into predetermined lengths while predetermined arrays of teeth are removed therefrom.

46 Claims, 7 Drawing Figures

APPARATUS FOR GAPPING ZIPPER CHAIN

The present invention relates to a device for gapping and cutting continuous zipper chain and more particularly to a device which is adapted to remove predetermined arrays of zipper teeth in a continuous zipper chain and to cut the chain at predetermined locations along its path.

In the manufacture of zippers, a continuous length of zipper chain is initially produced in which two strips of zipper tape are interconnected by zipper teeth in a conventional manner. In order to produce individual zippers from this tape it is necessary to cut gaps or spaces in the tape at predetermined locations by removing individual teeth from the chain. In addition, it is necessary to cut the zipper chain at or adjacent these spaces in order to produce individual zipper chain lengths for use in completed zippers.

When removing teeth from a zipper chain to produce a completed zipper, it also is necessary to remove only certain teeth from the chain so that, preferably, the same array of teeth are removed from each length of chain to be cut and so that the last tooth of the array is removed on the same side of the tape in each length. For example, it is most desirable to have the first tooth on the leading end of a length of zipper, i.e., adjacent a gap or array of removed teeth therein, on the "pin" side of the zipper chain in order to facilitate insertion of the zipper slide on the zipper itself.

Accordingly, it is an object of the present invention to produce pre-gapped individual strips of zipper chain having predetermined lengths and teeth spacing from a continuous supply of such chain.

Another object of the present invention is to provide an apparatus which is adapted to continuously gap and cut a continuous length of zipper chain in a predetermined manner.

Yet another object of the present invention is to produce a device of the character described which is relatively inexpensive to manufacture and simple and durable in operation.

In accordance with one aspect of the present invention, apparatus is provided for continuously producing gapped strips or lengths of zipper chain from a continuous supply of zipper chain wherein each strip has a predetermined length and a predetermined array of zipper teeth removed therefrom. The device includes a frame structure having zipper tooth removing and zipper cutting stations located therein with the zipper cutting station being located downstream of the tooth removing station, along the path of travel of the zipper chain through the device.

At the tooth removing station a support head is mounted in the frame for reciprocal vertical movement and has a zipper tooth chopping element mounted thereon for vertical movement with the head and with respect to a zipper chain passing therebelow. The zipper chain is supported at the tooth removing station on a support platform which is located in generally vertical alignment with the tooth chopping element and has an elongated groove formed therein extending in the path of travel of the zipper chain, with the teeth in the chain located in vertical alignment with the groove, so that upon reciprocation of the support head and thus the chopping element, the groove in the support platform cooperates with the chopping element to remove teeth from the zipper chain.

In the illustrative embodiment of the invention, the zipper chain is of the type having metal zipper teeth constructed in the conventional manner, although it is contemplated that the device of the present invention would be suitable for use with other types of zipper chains including those having two interlocked plastic filament coils forming the zipper teeth.

In addition, a registration device is resiliently mounted on the support head for vertical movement therewith and for vertical movement with respect to the chopping element. The registration device includes a projection which extends downwardly from the chopping element to engage at least one tooth on a chain positioned therebelow. This projection serves to precisely locate the chain and thus the teeth in the chain with respect to the chopping element prior to removal of the zipper teeth by the chopping element so that only a predetermined array of teeth are removed, with the same array being removed in each stroke of the chopping element. This action of the registration device is hereinafter referred to as "polarization" for convenience. Moreover, the reciprocating head is selectively actuable through a drive system in individual strokes so that as the zipper chain is moved through the device, successive arrays of teeth will be removed from the chain at predetermined locations therealong.

At the cutting station an anvil roller is rotatably mounted in the frame along an axis which extends generally perpendicular to the path of travel of the zipper chain and a cutting roller is rotatably mounted in the frame for cooperation with the anvil roller in superimposed relation therewith along an axis extending generally parallel to the axis of rotation of the anvil roller. The cutting roller includes a knife edge which cooperates with the anvil roller to cut the zipper chain as it passes therebetween, with the knife edge located on the periphery of the cutting roller and extending generally parallel to the axis of rotation thereof in a plane that is parallel to the diameter of the cutting roller so that the knife edge approaches the anvil roller at an angle, thereby to improve its cutting characteristics. The cutting roller is operatively connected to the drive means which reciprocates the support head at the tooth removing station so that it is rotated simultaneously with the reciprocation of the head. However, the knife edge on the roller is located in a predetermined position with respect to the chopping element so that it cuts the zipper chain after the chopping element has removed an array of zipper teeth and as the chopping element moves upwardly in its stroke. In addition, the cutting roller includes an enlarged cam section immediately behind the knife edge in the direction of rotation, which cam section cooperates with the anvil roller to pull the free edge of the cut tape through the device. Thus, on the downward portion of the stroke, the registration device positions or polarizes the zipper chain with respect to the chopping element, so that the chopping element thereafter removes a predetermined array of teeth from the chain; then, on the upward portion of the stroke of the chopping element, the knife edge cuts the zipper chain and the cam section of the cutting roller pulls the tape through the apparatus.

The above, and other objects, features and advantages of the present invention, will be apparent in the following detailed description of an illustrative embodiment thereof which is to be read in connection with the accompanying drawings, wherein.

Figure 1:
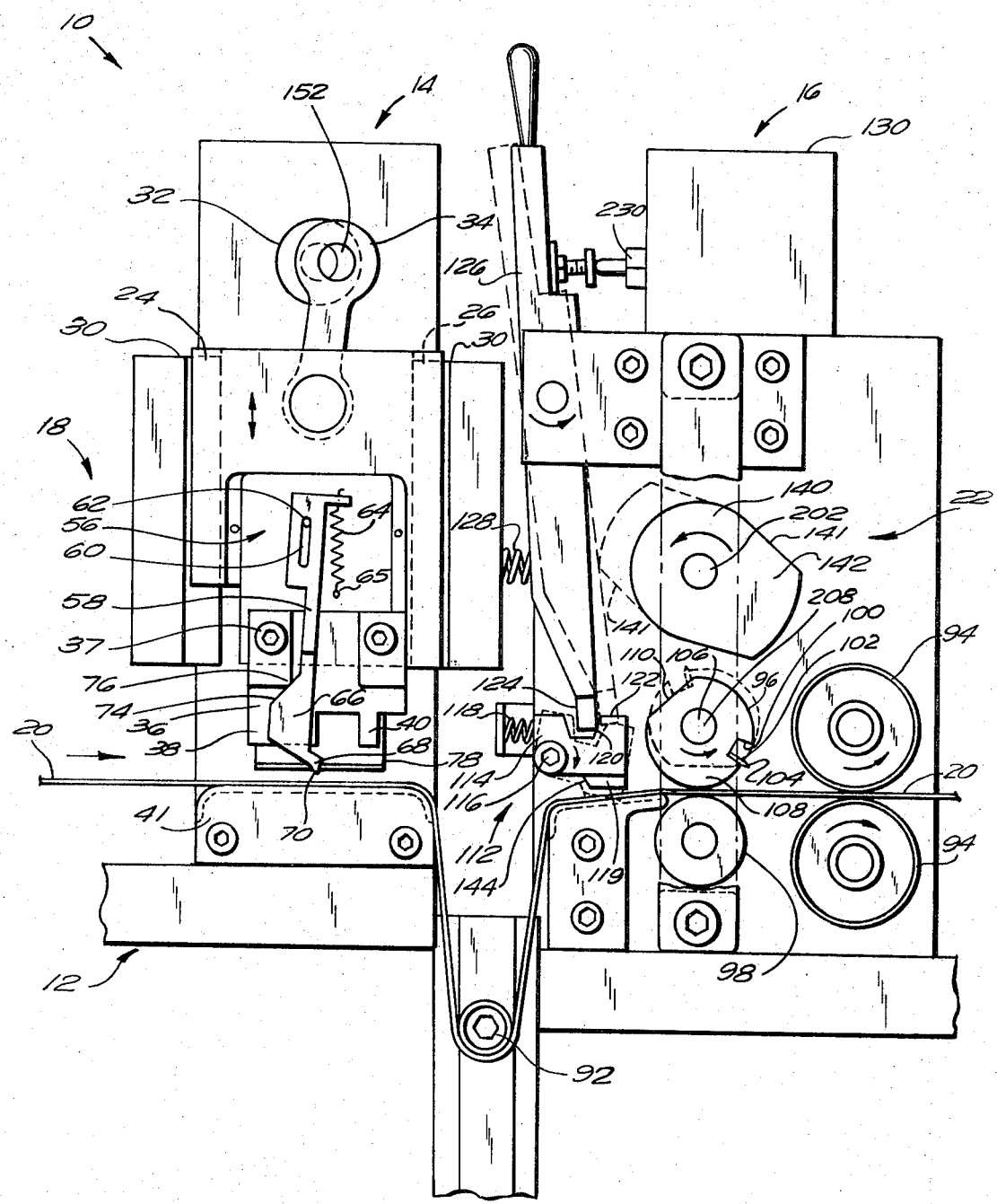
FIG. 1 is an elevational view of a device for gapping and cutting predetermined lengths of zipper chain from a continuous supply of chain, in accordance with one embodiment of the present invention and illustrating, in solid and dotted lines, the movement of some of the components therein.

Referring now to the drawing in detail, and initially to FIG. 1 thereof, it will be seen that a device 10 for gapping and cutting lengths of zipper chain from a continuous supply thereof, in accordance with the present invention, includes a frame 12 in which a tooth removing or chopping station 14 and a zipper chain cutting station 16 are located. Chopping station 14 includes a tooth removing apparatus 18 which is constructed to remove a predetermined array of zipper teeth from a continuous supply of zipper chain 20 at predetermined locations along the length of the chain. The latter is supplied to chopping station 14 from a supply roll and has a relatively long length, of several hundred feet or more.

From the chopping station 14, tape 20 is moved along a predetermined path of travel, more fully described hereinafter, to cutting station 16 which includes a zipper chain cutting mechanism 22 operated in synchronism with the tooth chopping apparatus 18. Cutting mechanism 22 is constructed to cut the zipper chain along a section of removed teeth in a predetermined array of removed teeth, so that the tape is cut into predetermined lengths.

Figure 2:
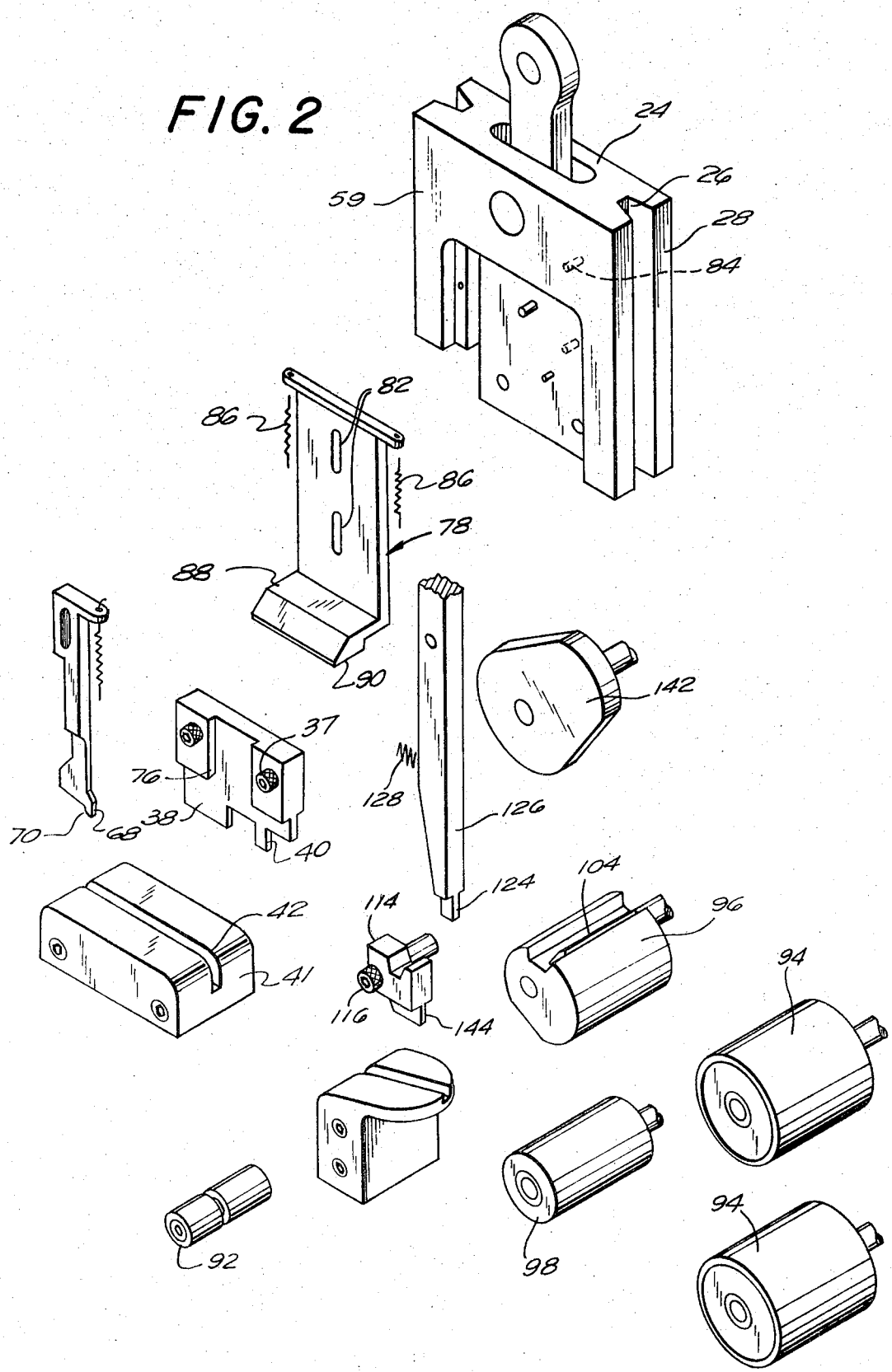
FIG. 2 is an exploded perspective view of some of the major components of the apparatus illustrated in FIG. 1.

The tooth removing or chopping apparatus 18, as seen in FIGS. 1 and 2, includes a support head 24 having grooves 26 formed in its side edges 28, which grooves receive guide tracks 30 on frame 12 so as to slidably mount the head in the frame for vertical movement with respect to the tape 20 passing therebelow. Support head 24 is vertically reciprocated by a rotatably mounted crank 32 which is driven through a motor and clutch arrangement described more fully hereinafter, and which is connected by a pitman 34 to head 24.

Figure 3:
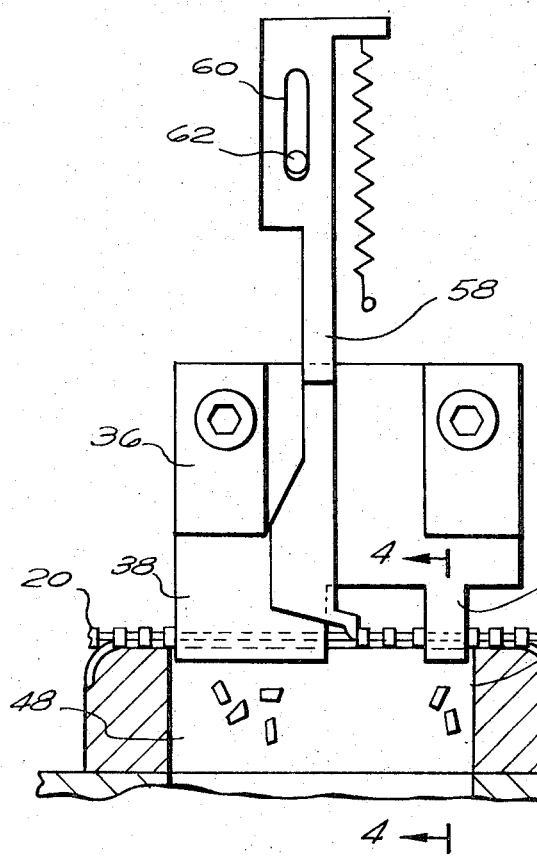
FIG. 3 is an enlarged elevational view of the zipper tooth chopping and registration means utilized in the apparatus of FIG. 1.

A tooth removing or chopping element 36 is rigidly mounted on head 24 by a plurality of bolts 37 or the like and includes a pair of projections 38, 40 which, when head 24 is reciprocated, serve to remove or "knock out" teeth in the zipper chain 20 passing therebelow. To assist in this operation, zipper chain 20 is supported on a platform 41, more clearly illustrated in FIGS. 2 and 4, which platform has an elongated groove 42 that extends in the direction of travel of tape 20. Groove 42 serves to support the zipper chain 20 with the teeth 44 thereof in the groove and in direct alignment with projections 38, 40 of chopping element 26. Thus, upon downward reciprocation of head 24, projections 38, 40 of chopping element 36 will engage teeth 44 on zipper chain 20 and cooperate with the edges 46 of groove 42 to remove the teeth from the chain. For convenience, support block 41 is provided with a single bore 48, over a predetermined portion of groove 42, as seen in FIG. 3, to permit discharge of the removed teeth from the device under the influence of gravity.

Figure 5:
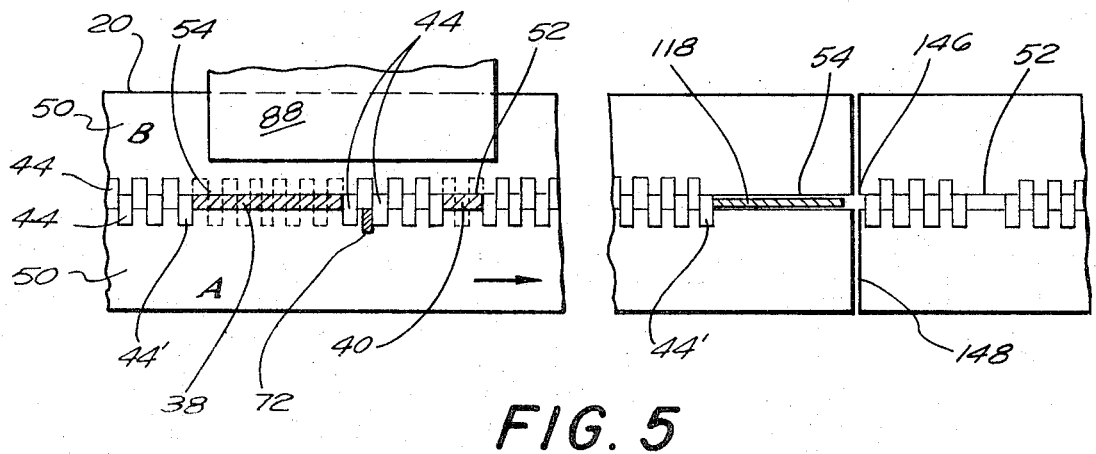
FIG. 5 is an enlarged partial plan view of a length of zipper chain, illustrating the various operations of the apparatus of FIG. 1 on the chain.

Referring to FIG. 5 of the drawing, it is seen that zipper chain 20 is formed from two lengths of tape 50A and 50B, formed of cloth or the like, which are interconnected in the conventional manner by zipper teeth 44. As mentioned, in the manufacture of lengths of zipper chain, it is desirable to remove predetermined arrays of teeth from each length of tape. Thus for example, in the pants industry, it is necessary to remove a small number of teeth 52 at one end of the zipper and to remove a larger number of teeth 54 at the other end of the zipper to facilitate sewing the zipper into the fabric or garment in which the zipper is used. In addition, at the upper end (54) of the zipper, it is desirable that the leading zipper tooth 44' therein be on a predetermined side or tape of the zipper, i.e. 50A. This side of the zipper is normally referred to as the "pin" side of the zipper and the provision of the leading tooth of the zipper chain on that side of the zipper permits insertion of the zipper slide thereon.

Accordingly, by the construction of the projections 38, 40, zipper tooth chopper 36 simultaneously forms segments 52, 54 of removed zipper teeth in chain 20, with segment 52 having only three teeth removed by the smaller projection 40, while larger section 54 has a larger number of teeth removed by the larger projection 38. Of course it is to be understood that the size of gaps 52 and 54 can be varied as required by the particular use to which the zipper is to be put.

In order to insure that the proper array of teeth 44 is removed from chain 20 and to insure that the leading tooth 44' of the larger space 54 is always on the selected pin side 50A of tape 20, a registration device 56 is provided for cooperation with chopper 36. Registration device 56 includes an elongated rigid bar 58 having a slot 60 formed in its upper end. Slot 60 receives a pin 62 rigidly mounted in head 24 to thereby slidably mount bar 58 on the head. In addition, bar 58 is operatively connected to a tension spring 64 which is secured at its end 65 to head 24 in order to bias bar 58 into its lowermost position. In this manner, bar 58 will move with head 24 during reciprocal motion thereof and also will permit relative movement of the head with respect to the bar. It is also noted that in order to prevent inadvertent disengagement of slot 60 and pin 62, a cover plate (not shown) can be mounted on the side 69 of head 24 to cover pin 62 and bar 58 and thus prevent lateral movement therebetween which would separate the bar from pin 62.

The lower end 66 of bar 58 includes a projection tooth 68 having a cam surface 70 which is adapted to engage the teeth 44 on zipper chain 20 passing therebelow. This tooth normally projects below the level of chopping projection 38, 40, so that as head 24 moves downwardly during a reciprocal stroke, projection 68 will contact either one of the teeth on a zipper chain 20 positioned therebelow prior to engagement of the zipper teeth with projections 38, 40, or it will enter into the space 72 (FIG. 5) between adjacent teeth 44 on the zipper chain.

To insure proper registration or polarization of chain 20 and projections 38, 40, bar 58 is provided with a cam surface 74 which is engaged against an abutment 76 formed on chopping element 36. On the downward stroke of head 24 projection 68 engages the zipper tape and thereby is held against further downward movement. However, head 24 continues to move downwardly with respect to bar 58, thus causing abutment 76 to move against cam surface 74 to pivot bar 58 in a counterclockwise direction, or towards the right in FIG. 1. If projection 68 was engaged with a zipper tooth, this movement would cause the projection to enter and drop into space 72 under the influence of spring 64. In any case, whether tooth 68 is moved into space 72 by the pivotal movement of bar 58 or whether it enters space 72 directly, once it is in space 72, the counterclockwise rotation of bar 58 under the influence of abutment 76 moves the tape to the right, just prior to engagement therewith by projections 38, 40. This motion polarizes the tape with respect to the projections, thereby insuring proper registration of teeth 44 with these projections. It is to be noted that by the location of abutment 76 and cam surface 74 on the side of bar 58 opposite spring 64, surface 74 is biased towards abutment 76 to insure precise operation of the registration device.

Figure 4:
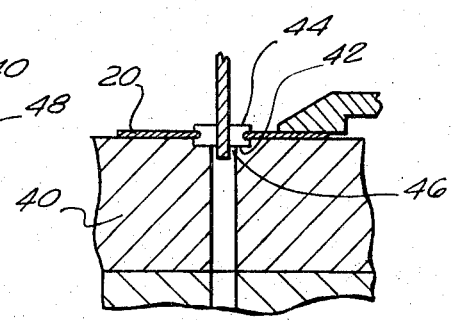
FIG. 4 is a sectional view taken along line 4—4 of FIG. 3.

Thus, as projections 38, 40 approach zipper chain 20, bar 58 attains the position illustrated in Figure wherein pin 62 is located adjacent, but spaced from, the lower end of slot 60 with teeth 44 in proper registration with projections 38, 40. Further continued downward motion of the chopping element 36 causes the projections 38, 40 to engage teeth 44 therebelow and push those teeth down into slot 42 and bores 48 of the support platform 40 so that teeth 44 are cut from the tape (FIGS. 3 and 4).

To further enhance the operation of chopping element 36, reciprocation support head 24 may be provided, if desired, with a resiliently mounted presser foot 78 having a generally L-shaped configuration, as illustrated most clearly in FIG. 2. The leg 80 of presser foot 78 includes a pair of elongated slots 82 which receive pins 84 on head 24 thereby to mount foot 78 for vertical movement with respect to head 24. In addition, a pair of springs 86 are operatively connected between presser foot 78 and head 24, in the manner illustrated, so that the presser foot is normally biased downwardly with respect to head 24 with pins 84 engaged against the uppermost portions of slots 82. It is noted that for clarity of illustration in the drawings, presser foot 78 has been illustrated in FIG. 2 to be on the front side of head 24 but, in fact, it is mounted on the rear side of the head on pins 84, shown in dotted lines therein. It is also to be understood, that the device of the present invention will operate satisfactorily without the use of presser foot 78.

The leg 80 of presser foot 78 terminates in a perpendicularly extending leg 88 which is located below the level of the free edges of projections 38, 40 but above the free end of projection 68 on registration device 56 (FIG. 1). Leg 88 provides a lower clamping surface 90 which is adapted to engage the intermost tape 50B of zipper chain 20 to hold the zipper chain in a relatively fixed position at tooth removing or chopping station 14 during the actual chopping operation. Because clamping surface 90 is located above the level of projection 68 it does not interfere with the operation of the registration device 56 and thus zipper chain 20 is registered with respect to projections 38, 40 prior to engagement of tape 50B by clamping surface 90. However, because the clamping surface is below the free edges of chopping projections 38, 40, it engages and lightly clamps zipper chain 20 against support platform 41 prior to the actual removal of teeth 44 by these projections. Moreover, on the upward stroke of head 24 chopping element 36, and thus projections 38, 40, is removed from chain 20 prior to presser foot 78. Thus, the presser foot remains in contact with tape 50B until pins 84 reach the uppermost portions of slots 82 so as to hold the zipper chain against platform 41 and thereby prevent upward movement of zipper chain 20 with projections 38, 40 should they become frictionally engaged with the tape teeth.

From tooth removing station 14, zipper chain 20 (after teeth 44 in spaces 52, 54 have been removed) passes to cutting station 16, over an adjustable guide roller 92. This guide roller is vertically adjustably mounted in frame 12, in any convenient manner, in order to adjust the length of the path of travel of the zipper chain from chopping station 14 to cutting station 16. This adjustment is provided to permit adjustment of the length of the cut segments of tape produced by the apparatus, as more fully described hereinafter.

Cutting station 16 includes a pair of rotatably mounted pull rollers 94 which are driven, as more fully described hereinafter, to draw zipper chain 20 through the device between individual cuts of the tape. The actual cutting operation is performed by the cooperation of a driven cutting roller 96 and a freely rotatably mounted anvil roller 98. Cutting roller 96 has an irregular peripheral configuration and includes a slot 100 in which a knife blade 102, having a knife edge 104 formed thereon, is mounted. Knife blade 102 extends parallel to the axis of rotation of roller 96, but is mounted to be parallel to a diameter of the roller so as not to be on a radius of the roller. Thus, upon rotation of roller 96, knife edge 104 approaches anvil roller 98 and zipper chain 20 thereon at an angle, i.e. tangentially to roller 98, so as to enhance the cutting action of the knife edge.

The periphery of roller 96 also includes an enlarged protuberance or cam portion 108 located thereon rearwardly of the knife edge in the direction of rotation of the roller, as indicated by the arrows in FIG. 1. This cam portion is dimensioned to cooperate with roller 98 and to draw the leading edge of the zipper chain 20 through the apparatus and direct it into drawing rollers 94 after a cut is made, as shown in dotted lines in FIG. 1. In addition, the periphery of roller 96 includes a flat portion 110, which is located still further rearwardly of knife edges 104 in the direction of rotation of roller 96. This flat surface is located to be positioned opposite anvil 98 when the rotation of roller 96 is stopped, between cuts of the tape, as more fully described hereinafter and as illustrated in solid lines in FIG. 1. By the provision of flat section 110 in this location when roller 96 is stopped, the zipper chain 20 is free to be pulled through the apparatus by draw rollers 94 between cuts in the tape.

Actuation of cutting roller 96 and also reciprocation of head 24, are initiated by a sensing device 112, located at cutting station 16, which is operative to detect the presence of a large gap or space 54 previously cut in zipper chain 20 by projection 38. Upon detection of this gap, draw rollers 94 are stopped and support head 24 and cutting roller 96 are driven so that head 24 removes teeth from zipper chain 20 at chopping station 14 and immediately (i.e., after projection 68 disengages the tape on the upward stroke of head 24) thereafter the knife 102 cuts the tape at a section thereof having a previously removed array of teeth, at cutting station 16.

Sensing mechanism 112 includes a first lever 114 pivotally mounted on frame 12 at pivot point 116. Lever 114 may be biased for rotation in a clockwise direction by spring 118 operatively connected between the lever and frame 12 in any convenient manner. Lever 114, in turn, includes a projection 119 which has a length that is greater than the length of space or gap 52 but less than that of gap or space 54. This projection normally rides along teeth 44 of zipper chain 20 as it passes through the apparatus and, because of its size, permits free passage of the smaller gaps 52 therebelow. However, upon movement of a larger gap 54 therebelow, projection 119 enters gap 54, thereby causing lever 114 to pivot in a clockwise direction under the influence of gravity or of spring 118, if such a spring is utilized, thereby to initiate the sequence of operation of the apparatus.

To accomplish this, lever 114 is provided with a recess 120 on its upper surface 122 which receives the free end 124 of a second or control lever 126 that is also pivotally mounted on frame 12. Lever 126 is biased for rotation in a counterclockwise direction, i.e. a direction opposite to the biased rotation of lever 114, by a spring 128 operatively connected in any convenient manner between the lever and frame 12. In the normal operating position of lever 114, illustrated in solid lines in FIG. 1, free end 124 of lever 126 is restrained in notch 120 against movement in its counterclockwise direction and lever 126 is held in its solid line position.

When a gap 54 in the tape moves into position adjacent projection 119, so that lever 114 pivots clockwise into the gap 54, lever 126 is freed for counterclockwise movement under the influence of spring 128 into its dotted line position shown in FIG. 1 wherein lever 126 engages the top surface of lever 114 to latch the latter in its downward position. This movement of lever 126 controls a pair of microswitches 130, 132, which respectively control a pair of clutches 134, 138 (FIG. 6) mounted in the rear of frame 12. Clutch 134 drives head 24 and cutting roller 96, upon actuation of switch 130, while clutch 138 drives rollers 94 upon actuation of switch 132.

Clutch 134 is a one revolution clutch, more fully described hereinafter, which, upon actuation of microswitch 130 by pivotal movement of lever 126 in a counterclockwise direction, drives crank 32 in one revolution while simultaneously driving roller 96 through one revolution so as to perform individual chopping and cutting actions in that one revolution of the crank. During this movement of head 24 and roller 96 through clutch 134, lever 126 is returned to its solid line position thereby releasing or unlatching lever 114 and actuating microswitch 132 to drive rollers 94. This is accomplished by means of a cam roller 140, rotatably mounted in frame 12 in vertical alignment with cutting roller 96 and drive therewith.

Cam roller 140 has an enlarged cam portion 142 which is adapted to sequentially engage lever 126 once during each of its revolutions. Cam portion 142 is located on roller 140 in a predetermined position with respect to knife edge 104 of roller 96 so that the leading edge 141 of cam 142 engages lever 126 just prior to the contact of knife edge 104 with zipper chain 20, as shown in dotted lines in FIG. 1. In this manner, cam 142 pivots lever 126 about its pivotal mounting in a clockwise direction to return the lever to its solid line position and actuate switch 132 just as a cut is made in zipper chain 20. Actuation of switch 132 actuates clutch 138 and thus causes rollers 94 to rotate, in the direction indicated by the arrows in the drawing, so as to pull zipper chain 20 through the device during the cutting operation. After the cut is made, enlarged cam portion 108 on roller 96 engages the free end of the cut zipper chain and pulls it through the cutting station leading that free edge into the purchase between rollers 94, which rollers are still rotating, so as to draw the zipper chain through the device until the next gap 54 is sensed by lever 114. At that point, the lever 126 moves to its dotted line position, thereby deactivating switch 132 to stop rotation of rollers 94 and to actuate switch 132 which in turn controls the actuation of the one revolution clutch 134. The sequence of operation continues in a like manner throughout the operation of the device until the entire supply of zipper chain 20 is gapped and cut, or until the desired quantity of zipper is produced, at which point the machine is stopped.

As mentioned, roller 92 is vertically adjustably mounted on frame 12 to plurality of positions, in any convenient manner. Thus, by properly adjusting the location of roller 92 on frame 12, the length of the path of travel of zipper chain 20 from projection 119 of lever 114 to the projection 38 of chopping element 36 can be adjusted so that that distance equals the desired length of cut zipper chain, or a multiple of that length. This arrangement insures that the distance between cuts made by roller 96 will occur at the same location on the zipper chain with respect to each removed array of teeth on the chain.

It is also noted that roller 96 is mounted in a predetermined position with respect to the other elements of the device, so that upon actuation, the roller does not immediately cut the tape. That is, when roller 96 is stopped at the end of its single revolution under the influence of one revolution clutch 134, it comes to rest in the solid line position illustrated in FIG. 1 wherein the knife edge 104 is approximately 180° away from the purchase between the cutting roller and anvil 98. Thus, after actuation of roller 96, and just prior to engagement of knife edge 104 with chain 20, the rollers 94 are activated, as described above, to draw the zipper chain through the device, thereby causing the zipper chain to move towards the purchase between the cutting roller and anvil 98. This movement causes lever 114 to pivot upwardly in a counterclockwise direction, because of the engagement of the cam surface 144 of projection 119 against the tooth 44' on zipper chain 20. As a result, gap 54 moves into the purchase between cutting roller 96 and anvil 98. The dimensions of rollers 94 and the speed of rotation of roller 96 is designed such that as the leading edge 146 (FIG. 5) of gap 54 approaches the purchase between cutting roller 96 and anvil 98, the knife edge 104 also approaches this purchase and makes a cut 148 in the tape adjacent edge 146, so that a cut in the tape is always made at the desired location therealong.

Figure 6:
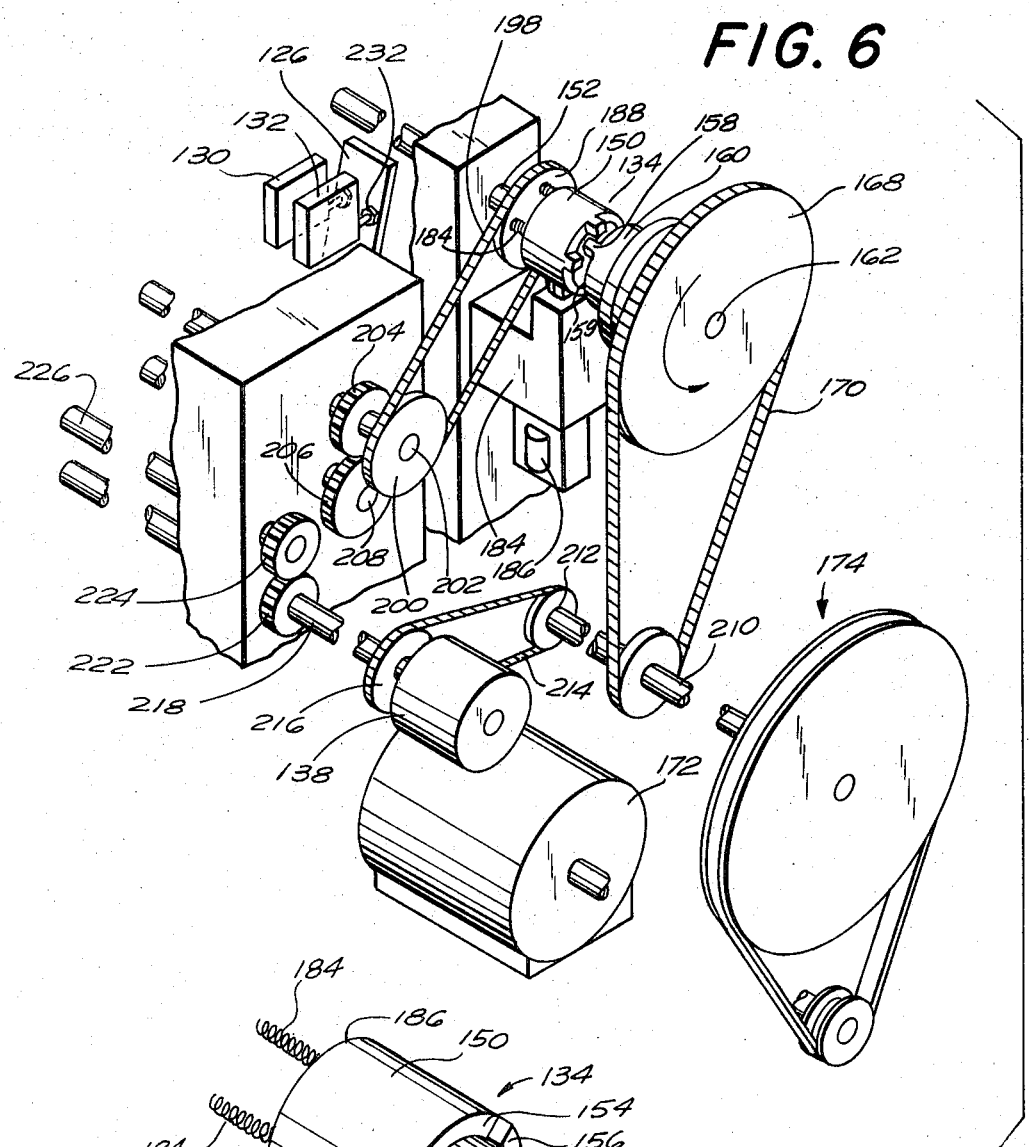
FIG. 6 is an enlarged perspective view of the rear of the apparatus, illustrating the drive system therefore.
Figure 7:
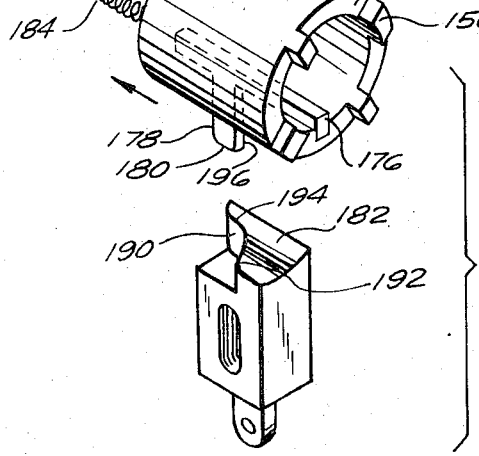
FIG. 7 is an enlarged exploded perspective view of a portion of a clutch apparatus utilized in the drive system of FIG. 6.

Referring now to FIGS. 6 and 7 of the drawing, it is seen that one revolution clutch 134 includes a hollow sleeve 150 which is slidably mounted and keyed to a driven shaft 152 that is rigidly connected to crank 32 in order to rotate that crank. Sleeve 150 includes a first clutch surface 154 including a plurality of lugs 156 extending outwardly thereof parallel to the axis of rotation of sleeve 150 and shaft 152. Lugs 156 are constructed to cooperate with a complementary array of lugs 158 on the clutch surface 159 of a second clutch element 160. The latter is rigidly connected to a sprocket 168 and both clutch element 160 and sprocket 168 are rotatably mounted on shaft 162, or for example by a bearing (not shown). Sprocket 168 is driven from a motor 172 through chain 170 and drive 174, as illustrated in FIG. 6.

Sleeve 150 is keyed to shaft 152 by an elongated rail 176 in order to transmit the rotational movement of clutch element 160 to shaft 152 and to maintain the relative position of sleeve 150 with respect to shaft 152. Key element 176 has a generally T-shaped configuration and includes a stem 178 which defines a cam follower surface 180 on the free end thereof. This cam follower has the general configuration of a rectangle, with its corners rounded, to give it the general appearance of a superellipse when viewed in plan.

Cam follower 180 is constructed to cooperate with a cam element 182 mounted for reciprocation in a block 184 supported on frame 12. Cam element 182 is operatively connected to an electrical solenoid 186, of conventional construction, which is adapted to reciprocate cam element 182 in block 184 with respect to sleeve 150 and at a substantially perpendicular angle to axis of rotation of the sleeve.

Solenoid 186 is responsive to actuation of switch 130 upon pivotal movement of lever 126 in its counterclockwise direction and operates to retract cam 182 downwardly with respect to sleeve 150. The cam, in its normal position, is located adjacent the surface of sleeve 150 to interfere with the travel of cam follower 180. Thus, upon retraction of cam 182, when switch 130 is actuated, cam follower 180, and therefore sleeve 150, are free for rotation under the influence of clutch element 160.

In order to accomplish rotation of sleeve 150, the sleeve is biased into engagement with clutch element 160 by a plurality of springs 184 or the like which are operatively engaged between the rear end 186 of sleeve 150 and a sprocket 188 rigidly mounted on shaft 152 for rotation therewith. Accordingly, when cam 182 is retracted, springs 184 urge sleeve 150 towards the right, as seen in FIG. 6, so that lugs 160 on clutch surface 154 engage the lugs 158 on clutch element 160 to transmit the rotational movement of clutch 160 to sleeve 150. Cam 182 is returned to its normal position adjacent the surface of sleeve 150 under the operation of the solenoid's spring upon deactivation of switch 130 when lever 126 pivots in its clockwise direction under the influence of cam surface 142 as described above. Thus, as sleeve 150 completes its first revolution, cam follower 180 is brought into position adjacent cam 182 and is engaged therewith.

Cam 182 is provided with a cam surface 190 which has a first cam portion 192 having an inclined configuration. Thus, as cam follower 190 completes its first revolution, it engages cam surface 192 and is urged towards the left (FIGS. 6 and 7) by contact with this cam surface to move sleeve 150 against the bias of springs 184 thereby to remove lugs 156 from engagement with lugs 158. As a result, shaft 152 is driven through only a single rotation during each actuation of micro-switch 130.

In order to prevent inertial rotation of sleeve 150 and shaft 152 beyond a single revolution, after disengagement of the clutch element, cam 182 is provided with a second cam surface 194 which is relatively straight and extends generally parallel to the axis of rotation of shaft 152. The straight cam surface 194 ultimately engages the side 196 of cam follower 180 to prevent further rotation of the cam follower under inertial forces of sleeve 150, thus assuring only one revolution of shaft 152 upon actuation of switch 130.

Sprocket 188 which, as mentioned, is rigidly secured to shaft 182, rotates therewith through this single revolution. The sprocket is operatively connected through a chain 198 to a sprocket 200 rotatably mounted in frame 12. Sprocket 200 is secured to a shaft 202 and thus is simultaneously driven in one revolution by clutch 134 upon actuation of microswitch 130. In addition, spur gear 203 is in meshed engagement with a second spur gear 206 rigidly mounted on a shaft 208. The latter shaft is secured to cutting roller 96 so that the cutting roller is simultaneously rotated with cam roller 140 and shaft 152 upon actuation of switch 130.

Drive train 174 from motor 172 includes a shaft 210 on which is mounted a spur gear 212 drivingly connected through a chain 214 to an additional spur gear 216. The latter gear is rotatably mounted on a shaft 218 by a bearing or the like and is connected to the clutch 138 to drive one clutch face therein. Clutch 138 is a conventional electric clutch which has a driving surface continuously rotated by rotation of gear 216 from motor 172. The clutch also includes a driven surface operatively engaged with the shaft 218, (which extends into clutch 138 through the bearing on which gear 216 is mounted) so that upon actuation of electric clutch 138, shaft 218 is rotated.

Shaft 218 includes a spur gear 222 rigidly mounted thereon and which is in meshing engagement with a second spur gear 224. Shaft 222 extends through frame 12, and the lowermost of rollers 94 is rigidly mounted thereon for rotation therewith. Similarly, the upper roller 194 is rigidly mounted on shaft 226 which is driven by spur gear 224. It is noted that spur gears 222 and 224 have a like diameter so that cutting roller 96 and cam roller 140 have the same speed of rotation and their relative positions are always maintained in synchronism.

Accordingly, in the operation of device 10, a previously removed array of zipper teeth 44 is detected at the cutting station 16 by the lever 114, which senses the presence of a large gap section 54 passing therebelow. As this occurs, lever 114 pivots in a clockwise direction about its axis of rotation, thereby freeing lever 126 to move counterclockwise under the influence of spring 128. This counterclockwise movement releases the switch contact 230 of switch 130 to thereby actuate the microswitch and thus solenoid 186, through a conventional electrical circuit which need not be described herein in detail. As a result, solenoid 186 is activated to retract cam element 182 from adjacent the clutch sleeve element 150. This causes the sleeve 150 to slide outwardly, or towards the right in FIG. 6, under the influence of springs 184 so that its clutch surface 154 mates with and engages the clutch surface 159 on cam element 160. As a result, the clutch element 150 is rotated by clutch element 160 to thereby commense rotation of shaft 152.

Crank 32 is mounted on shaft 152 in a predetermined relation with respect to clutch 134 so that at the initiation of rotation of shaft 152, the crank is in the position illustrated in FIG. 1, i.e. approximately 90° to the right from the top of dead center. Thus, during a single revolution of shaft 152 head 24 is moved from this initial position to its lowermost position and returned and stopped again at its initial position shown in FIG. 1. During this revolution of shaft 152, crank 32 moves head 24 downwardly so that the projection 68 on the free end of bar 58 initially engages one of the teeth 44 on a zipper chain positioned therebelow, whereby cam surface 70 on projection 68, and the cooperation of cam surface 74 and abutment 76 described above, cooperate to position tape 70 in exact registration with the projections 38, 40 on chopping element 36. Approximately simultaniously, the clamping surface 90 of clamping element 78 engages zipper tape 50B to hold the zipper chain in a fixed position on support platform 40. The clamping force is sufficiently light so that polarization of the tape can occur even though clamping surface 90 is engaged with the tape.

Because of the slotted and spring biased mounting arrangement of bar 58 and clamping element 78, those elements remain in a relatively fixed position after contacting zipper chain 20, while head 24 continues to move downwardly. Ultimately, projections 38, 40 engage the teeth 44 of chain 20 in array sections 54, 52 respectively and cooperate with the bores 48 in support platform 40 to remove or "knock out" these teeth from the zipper chain.

Continued rotation of shaft 152 in its single revolution causes the head 24 to move upwardly, withdrawing projections 38, 40 from zipper chain 20 prior to disengagement of clamping surface 90 from the tape 50B so that the zipper chain is not inadvertently pulled upwardly with chopping element 36.

Cam roller 140 and cutting roller 96 are driven from shaft 152 through sprocket 188, these elements are simultaneously rotated with shaft 152 upon engagement of clutch element 150 with element 160. Moreover, cam roller 140 and cutting roller 96 are mounted on their respective shafts in predetermined locations so that when clutch element 150 is brought to a stop, i.e. to its position at the end of a single revolution thereof, these elements achieve the solid line positions illustrated in FIG. 1 of the drawing. These positions are selected so that cam element 142 will engage lever 126 to rotate the lever in a clockwise direction against the bias of spring 128 after removal of teeth from the zipper chain has occurred and thus only during the upward portion of the stroke of head 24. Similarly, knife edge 104 is located in position so that it does not engage the tape 20 passing between the purchase formed by the cutting roller and anvil roller 98 until after the beginning of the upward stroke of the support head 24 and thus of chopping element 36 (i.e. after projection 68 also disengaged from the tape). Moreover, the positions of the cam element and cutting roller are maintained in synchronism because they are driven by like sized spur gears 204 and 206.

Accordingly, after the removal of teeth 44 has occurred at chopping station 14, and the chopping element has begun to move upwardly during the upward portion of the stroke of head 24, the leading edge 141 of cam 142 engages lever 126 whereby cam 142 causes the lever to rotate in a clockwise direction returning the lever to its solid line position in FIG. 1. This movement causes actuation of the switch contact 232 of switch 132, thereby activating that switch and thus electric clutch 138. Upon actuation of clutch 138, shaft 218 is driven so that rollers 94 are rotated. This causes the zipper chain 20 to be drawn from the supply reel through the device.

Movement of zipper chain 20 in this manner causes cam surface 144 on projection 119 of lever 114 to engage against tooth 44' (of the space 54 in which projection 119 is engaged) thereby camming lever 114 upwardly and permitting zipper chain 20 to move toward cutting roller 96. As a result, the leading edge 146 of opening 54 is moved toward the right and towards the purchase between cutting edge or knife edge 104 and anvil 98.

The distance between projection 119 and anvil 98, and the location of the cutting edge 104 at the initiation of the single revolution of roller 96 is selected so that the leading edge 146 of space 54 arrives at anvil 98 at the same instant as cutting edge 104 so that the zipper chain 20 is cut along line 148. As a result, the smaller gap 52 formed by projection 40 is on one side of cut line 148 while the larger size gap 54 is on the opposite side thereof. Therefore, it would be appreciated that when like cuts are made in successive spaces 54, individual lengths of zipper chain will be provided which will have the large gap 54 at one end thereof and the smaller gap at the lower end. Thus completed zipper chains are manufactured and ready for insertion in a garment or the like.

Immediately after the cut of zipper chain 20 is made by knife edge 104, the connection between the zipper chain in the purchase between rollers 94 and the zipper chain in the supply reel is severed so that the tape upstream of knife edge 104 is not longer drawn through the device by rollers 94. However, cam surface 108, which is formed on the surface of cutting roller 96 immediately behind knife edge 104 in the direction of rotation of the roller, immediately engages the now free edge of the zipper chain at the cutting station and draws the tape through the device from the supply reel until the leading edge thereof enters the purchase between rollers 94.

As this occurs, clutch element 150 is completing its single rotation, and cam element 182 has been returned to its uppermost position under the spring element of solenoid 186 so that cam follower 180 engages cam surface 192. As a result, clutch element 150 is moved towards the left in FIGS. 6 and 7 and thus out of engagement with driven clutch element 160. Finally, clutch element 150 and thus shaft 152 is brought to a stop by engagement of the surface 196 of cam follower 180 with the flat surface 194 of cam 182. This therefore also stops movement of head 24 and rotation of cam roller 140 and cutting roller 96 in the position thereof seen in FIG. 1. As mentioned above, these elements are keyed to their respective shafts so that when clutch element 150 is stopped each of those elements is stopped in predetermined relative positions. Thus, the flat surface portion 110 of cutting roller 96 is located opposite anvil 98 when sleeve 150 is stopped so that rollers 94 can freely pull tape chain 20 through the device.

Rollers 94 are still operating at this point since clutch 138 is still in operation under the influenct of switch 132 to pull the zipper chain through the device. Ultimately, the last removed array of zipper teeth pass beneath lever 114 and projection 119 thereby enters the space or gap 54 causing lever 114 to rotate in a clockwise direction and again permitting lever 126 to rotate in a counterclockwise direction under the influence of spring 124 to actuate switch 130 and to deactivate switch 132. As this occurs, by the deactivation of switch 132, electric clutch 138 is disengaged so that the pull provided by rollers 94 is stopped. Thus, movement of zipper chain 20 through the machine is stopped simultaneously, clutch 150 is activated, as described above, to initiate the sequence of operation previously described.

Accordingly, it is seen that a relatively simple and inexpensively manufactured device is disclosed which is adapted to accomplish continuous manufacture of individual lengths of zipper chain having teeth removed therein in predetermined arrays such as are required for the manufacture of conventional zippers. It is to be appreciated that the various components of the device can be used either alone or in combination, and thus, for example, the chopping apparatus 18 can be used by itself with the uncut tape stored for later cutting as desired. Moreover, it is contemplated that the chopping element can be used for other types of web material in which gaps must be placed at predetermined locations.

Similarly, it is contemplated that cutting mechanism 22 can be used to cut any type of desired material having an indexing marking such as spaces or the like formed thereon; thus the use of that cutting mechanism is not limited to the manufacture of zippers.

Finally, it is noted that the device disclosed by the present invention incorporates a novel one-way clutch drive arrangement which assures accurate single revolutions of a driven shaft by a relatively simple and durable mechanism. This clutch arrangement also is not limited to use with the zipper manufacturing device disclosed in this application, but as would be apparent to those skilled in the art, would have application in a variety of fields.

Although an illustrative embodiment of the present invention has been described herein with reference to the accompanying drawings, it is to be understood that that invention is not limited to that precise embodiment, and that various changes and modifications may be effected therein by one skilled in the art without departing from the scope or spirit of this invention.

What is claimed is:

1. A device for forming gaps at predetermined locations in a continuous web having a plurality of ridges or the like extending transversely or the web, said device comprising, a frame, a chopping element mounted in said frame for reciprocal vertical movement therein, a support platform mounted in said frame below and in generally vertical alignment with said chopping element for supporting a web passing through said device in vertical alignment with said chopping element, and registration means mounted for vertical movement with said chopping element for engaging at least one ridge on said web to precisely locate said web prior to contact therewith by said chopping element, whereby, on the downward stroke of said chopping element said registration means positions said web with respect to said chopping element and said element removes a predetermined array of ridge sections from said web.

2. The device as defined in claim 1 wherein said web comprises a zipper chain and said device is adapted to remove a predetermined array of zipper teeth therefrom, and wherein registration means is resiliently mounted for vertical movement with respect to said chopping element and includes a projection extending downwardly of said chopping element to engage and precisely locate said zipper chain prior to engagement of said chopping element therewith, whereby said chopping element moves downwardly with respect to said projection to remove said predetermined array of teeth after said projection engages said at least one zipper tooth.

3. The device as defined in claim 2 including a presser foot resiliently mounted in said device for vertical movement with said chopping element, said presser foot having a clamping surface for engaging a zipper chain supported on said platform and being located below said chopping element and above said projection, whereby said presser foot engages said zipper chain while it is being precisely located by said projection to clamp said zipper chain between said clamping surface and said platform before and during removal of said predetermined array of teeth by said chopping element.

4. The device as defined in claim 3 wherein said presser foot is resiliently mounted for movement with respect to said chopping element.

5. The device as defined in claim 2 wherein said platform has a central groove therein extending in the path of travel of said zipper chain through the device, said platform supporting said chain with the teeth thereof in vertical alignment with said groove, whereby said groove cooperates with said chopping element to remove said predetermined array of teeth.

6. The device as defined in claim 2 including means for selectively reciprocating said chopping element with respect to said platform and means for detecting a previously removed array of teeth in said zipper chain and for actuating said reciprocating means in response thereto.

7. The device as defined in claim 2 wherein said chopping element includes a pair of dissimilar spaced projections for removing two dissimilar groups of zipper teeth in said chain to form said predetermined array.

8. A device for removing a predetermined array of zipper teeth from a continuous zipper chain comprising, a frame, a support head mounted in said frame for reciprocal vertical movement therein, means for selectively reciprocating said head, a zipper tooth chopping element mounted on said head for vertical movement therewith, a support platform mounted in said frame below and in generally vertical alignment with said head for supporting a length of zipper chain passing through said device, said support platform having an elongated groove therein extending in the path of travel of said zipper chain with the teeth in said chain in vertical alignment with said groove and said chopping element, and registration means resiliently mounted on said head for vertical movement therewith and for vertical movement with respect to said chopping element, said registration means including a projection extending downwardly of said chopping element for engaging at least one tooth on said chain to precisely locate said chain prior to contact therewith by said chopping element, whereby on the downward stroke of said chopping element said projection positions said zipper chain with respect to said chopping element prior to engagement of said chain with the chopping element and thereafter, said chopping element cooperates with the groove in said support platform to remove a predetermined array of teeth from said zipper chain.

9. The device as defined in claim 8 including a presser foot resiliently mounted on said support head for movement therewith and for vertical movement with respect to said chopping element, said presser foot having a clamping surface for engaging a zipper chain supported on said platform and being located on a level below that of said chopping element and above that of said projection, whereby said presser foot engages said zipper chain while it is being precisely located by said projection to clamp said zipper chain between said clamping surface and said platform before and during removal of said predetermined array of teeth by said chopping element.

10. The device as defined in claim 8 including means for detecting a previously removed array of teeth in said zipper chain and for actuating said reciprocating means in response thereto.

11. The device as defined in claim 8 wherein said chopping element includes a pair of dissimilar spaced projections for removing two dissimilar groups of zipper teeth in said chain to form said predetermined array.

12. The device as defined in claim 8 including a cam element mounted on said support head, said registration means having a cam surface cooperating with said cam element and being normally biased into engagement therewith, said engagement of said cooperating cam element and cam surface causing said projection to move along the path of travel of said zipper chain after said projection engages said chain and during continued downward movement of said head to precisly position said zipper chain with respect to said chopping element.

13. The device as defined in claim 12 wherein said registration means comprises an elongated generally vertically extending bar having an elongated slot formed in an upper portion thereof, a generally horizontally extending pin mounted on said head and received in said slot to permit limited vertical movement between said bar and said head, and spring means oepratively engaged between said head and said bar for biasing said bar into its lowermost position; said spring means being located on the side of said bar opposite said cam surface to simultaneously urged said cam surface into engagement with said cam element.

14. A device for continuously producing strips of zipper chain from a continuous zipper chain wherein each strip has a predetermined length and a predetermined array of zipper teeth removed therefrom, said device comprising, a frame, first and second operating stations, said second station being located downstream of said first station along the path of travel of said zipper chain through said device, means at said first station for removing a predetermined array of zipper teeth from a zipper chain positioned therein, means for precisely locating said zipper chain with respect to said tooth removing means immediately prior to removal of said teeth, means at said second station for detecting a previously removed array of zipper teeth and means, responsive to said detecting means for cutting said zipper chain at said second station.

15. The device as defined in claim 14 including drive means for selectively and simultaneously operating said tooth removing means and said cutting means in response to detection of a removed array of teeth by said detecting means.

16. The device as defined in claim 15 including means for drawing said zipper chain through said device after said chain is cut.

17. The device as defined in claim 16 wherein said drive means includes a motor, first clutch means operatively connected between said motor and said removing means and said cutting means and a second clutch means operatively connected between said motor and said drawing means, said first clutch means being operative in response to said detecting means to drive said removing means and said cutting means through a single operation upon detection of a removed array of teeth and said second clutch means being operative in response to said detecting means, from just prior to the cutting of said chain by said knife edge until the next removed array of teeth is detected by said detecting means.

18. The device as defined in claim 17 wherein said cutting means comprises an anvil roller rotatably mounted in said frame at said cutting station along an axis extending generally perpendicular to the path of travel of said zipper chain, a cutting roller rotatably mounted in said frame in superimposed spaced relation with respect to said anvil roller along an axis extending generally parallel to the axis of rotation of the anvil roller and including a knife edge for cooperation with said anvil roller to cut said chain, said knife edge being located on the periphery of said cutting roller and extending generally parallel to the axis of rotation thereof in a plane extending parallel to a diameter of said cutting roller; said cutting roller having an enlarged cam surface formed on the periphery thereof, rearwardly of said knife edge in the direction of rotation of said cutting roller, whereby said cam surface cooperates with said anvil roller to draw said zipper chain through said cutting station, after the zipper chain is cut by said knife edge, and direct the cut chain towards said drawing means.

19. The device as defined in claim 18 wherein said cutting roller has a flat peripheral surface portion located on the side thereof positioned adjacent said anvil roller prior to actuation of said first clutch means to permit free passage of said web through said cutting station between cuts.

20. The device as defined in claim 19 wherein said knife edge is located on said cutting roller in a predetermined position wherein said knife edge is remote from said anvil roller upon actuation of said first clutch whereby said knife edge arrives at a position adjacent said anvil roller after said predetermined array of teeth are removed by said removing means and after actuation of said drawings means to cut said zipper chain across the array of removed teeth detected by said detecting means.

21. The device as defined in claim 17 wherein said means for removing a predetermined array of zipper teeth comprises a chopping element mounted in said frame for reciprocal vertical movement therein in response to actuation of said first clutch and a support platform mounted in said frame below and in generally vertical alignment with said chopping element for supporting a length of zipper chain passing through said device with the teeth of said chain in vertical alignment with said chopping element, said support platform having a central groove therein extending in the path of travel of said zipper chain through said device, said platform supporting said chain with the teeth thereof in vertical alignment with said groove and said chopping element, whereby said groove cooperates with said chopping element to remove said predetermined array of teeth.

22. The device as defined in claim 21 wherein said means for precisely locating said zipper chain comprises registration means mounted for vertical movement with said chopping element and including at least one projection for engaging at least one zipper tooth on said chain and urging said chain along its path of travel until said projection enters a space between adjacent teeth on one side of said chain, thereby precisely locating the zipper teeth with respect to said chopping element.

23. The device as defined in claim 22 wherein said registration means is resiliently mounted for vertical movement with respect to said chopping element and said projection normally extends downwardly of said chopping element to engage and precisely locate said zipper chain prior to engagement of said chopping element therewith, whereby said chopping element moves downwardly with respect to said projection to remove said predetermined array of teeth after said projection engages and locates said zipper chain.

24. The device as defined in claim 23 including a presser foot resiliently mounted in said device for vertical movement with said chopping element, said presser foot having a clamping surface for engaging a zipper chain supported on said platform and being located below said chopping element and above said projection, whereby said presser foot engages said zipper chain while it is being precisely located by said projection to clamp said zipper chain between said clamping surface and said platform before and during removal of said predetermined array of teeth by said chopping element.

25. The device as defined in claim 24 wherein said presser foot is resiliently mounted for movement with respect to said chopping element.

26. The device as defined in claim 23 wherein said chopping element includes a pair of dissimilar spaced projections for removing two dissimilar groups of zipper teeth in said chain to form said predetermined array.

27. The device as defined in claim 23 including means for adjusting the length of the path of travel of said zipper chain between said removing means and said detecting means.

28. The device as defined in claim 17 wherein said first clutch means comprises a one revolution clutch including first and second clutch elements having opposed mating clutch surfaces, said first clutch element being operatively connected to said motor for continuous rotation thereby, said second clutch element being slidably mounted on and keyed to a driven shaft operatively connected to said removing means, means for biasing said second clutch element into engagement with said first clutch element and means for normally maintaining said second clutch element in spaced relation to said first clutch element and for permitting said second clutch element to engage said first clutch element in response to detection of a removed array of zipper teeth by said detecting means.

29. The device as defined in claim 28 wherein said last mentioned means comprises a cam element mounted for reciprocation with respect to said second clutch element along a path of travel extending generally perpendicular to said driven shaft, said second clutch element having a cam follower extending radially outwardly thereof in position to engage said cam element, said cam element having a cam surface cooperating with said cam follower to retract said second clutch element against the bias of said biasing means out of engagement with said first clutch element and means for normally maintaining said cam element in the path of travel of said cam follower and being responsive to said detecting means to momentarily retract said cam element upon detecting of a removed array of zipper teeth whereby said second clutch element moves into engagement with said first clutch element under the influence of said biasing means to drive said driven shaft through one revolution until said cam follower again engages said cam surface.

30. The device as defined in claim 29 wherein said retracting means comprises a solenoid and said cam surface includes a first cam portion causing retraction of said second clutch element upon contact with said cam follower and a second, relatively straight cam portion, extending parallel to said driven shaft to prevent inertial rotation of said second clutch element upon retraction thereof from engagement with said first clutch element.

31. The device as defined in claim 30 wherein said drive means further includes means operatively connecting said driven shaft to said cutting means whereby actuation of said first clutch simultaneously actuates said tooth removing means and said cutting means.

32. A device for continuously producing strips of zipper chain from a continuous zipper chain wherein each strip has a predetermined length and a predetermined array of zipper teeth removed therefrom, said device comprising a frame having zipper tooth removing and zipper cutting stations located therein, said zipper cutting station being located downstream of said tooth removing station along the path of travel of said zipper chain through said device, a support head mounted in said frame at said zipper tooth removing station for reciprocal vertical movement, a zipper tooth chopping element mounted on said head for vertical movement therewith, a support platform mounted in said frame below and in generally vertical alignment with said head for supporting a length of zipper chain passing through said device, said support platform having an elongated groove therein extending in the path of travel of said zipper chain with the teeth in said chain located in vertical alignment with said groove and said chopping element, registration means resiliently mounted on said head for vertical movement therewith and for vertical movement with respect to said chopping element, said registration means including a projection extending downwardly of said chopping element for engaging at least one tooth on said chain to precisely locate said chain prior to contact therewith by said chopping element and selectively actuable drive means for reciprocating said head in individual strokes wherein said chopping element cooperates with said grooved support platform to remove said predetermined array of teeth at successive locations therealong;

an anvil roller rotatably mounted in said frame at said cutting station along an axis extending generally perpendicular to said path of travel of said zipper chain, a cutting roller rotatably mounted in said frame in superimposed spaced relation with respect to said anvil roller along an axis extending generally parallel to the axis of rotation of the anvil roller and including a knife edge for cooperation with said anvil roller to cut said zipper chain as it passes therebetween, said knife edge being located on the periphery of said cutting roller and extending generally parallel to the axis of rotation thereof in a plane extending parallel to a diameter of said cutting roller, said cutting roller being operatively connected to said drive means for rotation thereby simultaneously with reciprocation of said head to sequentially position said knife edge adjacent said anvil roller for cooperation therewith in cutting said zipper chain, said knife edge being located with respect to said chopping element to cut said zipper chain after the chopping element has removed said predetermined array of zipper teeth and as the chopping element moves upwardly in its stroke, whereby, on the downward portion of the stroke of said chopping element said registration means positions said zipper chain with respect to said chopping element and said element removes a predetermined array of teeth from said chain, and on the upward portion of the stroke of said chopping element, said knife edge cuts said zipper chain.

33. The device as defined in claim 32 including a presser foot resiliently mounted on said support head for movement therewith and for vertical movement with respect to said chopping element, said presser foot having a clamping surface for engaging a zipper chain supported on said platform and being located on a level below that of said chopping element and above that of said projection, whereby said presser foot engages said zipper chain while it is being precisely located by said projection to clamp said zipper chain between said clamping surface and said platform before and during removal of said predetermined array of teeth by said chopping element.

34. The device as defined in claim 32 wherein said registration means comprises an elongated generally vertically extending bar having an elongated slot formed in an upper portion thereof, a generally horizontally extending pin mounted on said head and received in said slot to permit limited vertical movement between said bar and said head, and spring means operatively engaged between said head and said bar for biasing said bar into its lowermost position wherein said projection is below said chopping element.

35. The device as defined in claim 34 including a cam element mounted on said support head, said bar having a cam surface cooperating with said cam element, said spring means normally biasing said cam surface into engagement with said cam element and said cam element having a configuration which causes said projection to move along the path of travel of said zipper chain after said projection engages said chain and during continued downward movement of said head to precisely position said zipper chain with respect to said chopping element.

36. The device as defined in claim 35 wherein said chopping element includes a pair of dissimilar spaced projections for removing two dissimilar groups of zipper teeth in said chain to form said predetermined array.

37. The device as defined in claim 32 wherein said cutting roller includes an enlarged cam surface formed on the periphery thereof, rearwardly of said knife edge in the direction of rotation of said cutting roller whereby said cam surface cooperates with said anvil roller to draw said web through said cutting station after the web is cut by said knife edge.

38. The device as defined in claim 37 including means for receiving the cut web from said cutting station and drawing said web therethrough while said rotating means is stopped.

39. The device as defined in claim 38 including means at said cutting station for detecting a previously removed array of zipper teeth and for actuating said drive means in response thereto.

40. The device as defined in claim 39 wherein said detecting means includes a first lever pivotally mounted on said frame and resiliently biased to pivot in a first direction into contact with a zipper chain passing through said cutting station, said first lever including a projection located in vertical alignment with the teeth in said zipper chain and being dimensioned to enter the spaces in said chain formed by said removed array of teeth thereby permitting said first lever to pivot under the influence of its resilient bias, a second lever pivotally mounted in said frame and resiliently biased to pivot in a second direction, opposite to said first direction, and a first switch means mounted in said frame for controlling actuation of said rotating means, said first lever being operably engaged with one end of said second lever to normally prevent rotation thereof in said second direction and permitting such rotation when said first lever rotates in its first direction as it enters a space in said web, said second lever being operatively connected at its opposite end to said first switch means to actuate said switch means upon rotation of the second lever in its second direction thereby to actuate said drive means, whereby said head is reciprocated and said cutting roller is rotated to cut said web.

41. The device as defined in claim 40 wherein said drive means includes a motor, first clutch means operatively connected between said motor and said head and said cutting roller, and an electric clutch operatively connected between said motor and said driving means, said first clutch means being operative in response to said detecting means to reciprocate said head and rotate said cutting roller through a single operation in response to actuation of said first switch; a second switch operatively engaged with said other end of said second lever for actuating said electric clutch, and means for pivoting said second lever in a direction opposite to said second direction, against its resilient bias, immediately prior to cutting of said web by said knife edge, said second switch being responsive to the last mentioned pivotal movement of said second lever to actuate said electric clutch and thus said receiving and drawing means and being responsive to movement of said second lever in said second direction to disengage said electric clutch upon detection of the next removed array of teeth by said first lever.

42. The device as defined in claim 41 wherein said means for moving said second lever comprises a cam roller rotatably mounted in said frame and having an enlarged cam surface positioned to sequentially engage and pivot said second lever against its resilient bias, said last mentioned roller being operatively connected to said first clutch for synchronous movement with said cutting roller and said head, said last mentioned cam surface being positioned to engage said second lever immediately prior to the cutting of said zipper chain by said knife edge.

43. The device as defined in claim 41 wherein said first clutch comprises a one revolution clutch including first and second clutch elements having opposed mating clutch surfaces, said first clutch element being operatively connected to said motor for continuous rotation thereby, said second clutch element being slidably mounted on and keyed to a driven shaft operatively connected to said removing means, means for biasing said second clutch element into engagement with said first clutch element and means for normally maintaining said second clutch element in spaced relation to said first clutch element and for permitting said second clutch element to engage said first clutch element in response to detection of a removed array of zipper teeth by said detecting means.

44. The device as defined in claim 43 wherein said last mentioned means comprises a cam element mounted for reciprocation with respect to said second clutch element along a path of travel extending generally perpendicular to said driven shaft, said second clutch element having a cam follower extending radially outwardly thereof in position to engage said cam element, said cam element having a cam surface cooperating with said cam follower to retract said second clutch element against the bias of said biasing means out of engagement with said first clutch element and means for normally maintaining said cam element in the path of travel of said cam follower and being responsive to said detecting means to momentarily retract said cam element upon detection of a removed array of zipper teeth whereby said second clutch element moves into engagement with said first clutch element under the influence of said biasing means to drive said driven shaft through one revolution until said cam follower again engages said cam surface.

45. The device as defined in claim 44 wherein said retracting means comprises a solenoid and said cam surface includes a first cam portion causing retraction of said second clutch element upon contact with said cam follower and a second, relatively straight cam portion, extending parallel to said driven shaft to prevent inertial rotation of said second clutch element upon retraction thereof from engagement with said first clutch element.

46. The device as defined in claim 39 including means for adjusting the length of the path of travel of said zipper chain between said chopping element and said detecting means.

* * * * *